V. FRITZ.
PICKET PIN OR STAKE.
APPLICATION FILED JUNE 24, 1914.

1,161,303. Patented Nov. 23, 1915.

Witnesses

Inventor
Vernon Fritz,
By Richard Bowen.
Attorney

UNITED STATES PATENT OFFICE.

VERNON FRITZ, OF WATERLOO, IOWA.

PICKET PIN OR STAKE.

1,161,303. Specification of Letters Patent. Patented Nov. 23, 1915.

Application filed June 24, 1914. Serial No. 847,144.

*To all whom it may concern:*

Be it known that I, VERNON FRITZ, a citizen of the United States, residing at Waterloo, in the county of Blackhawk and State of Iowa, have invented certain new and useful Improvements in Picket Pins or Stakes, of which the following is a specification.

This invention relates to picket pins or stakes, and more particularly to means for securing a guy wire or rope thereto.

The object of my invention is to provide a stake which will positively retain the end of a rope in connection therewith and prevent displacement of the same.

My invention is particularly adapted for use in connection with the various forms of traps in which the trap is placed upon the ground and is attached by means of a chain to a stake or other stationary retaining means. This, in a great many cases, is objectionable, as when an animal is caught in the trap, the chain may be detached from the stake and the animal escape carrying the trap with it.

My invention seeks to avoid the above objections and resides in the provision of a stake formed from a strap of bendable metal, the same being provided with a head and a hook associated with the said head adapted to receive the free end of the chain or rope, in the case of a chain, the hook may receive one of the links of the chain and in the case of a rope a ring may be secured to the end of the rope and engage with the hook.

While my invention is particularly adapted to the purpose above set forth it will be readily understood from a perusal of the specification and an inspection of the drawings that my device may be put to other uses and serve to advantage, such as for the purpose of supporting the guy ropes of tents, canopies, etc.

My invention resides in the construction, combination and arrangement of parts as set forth in the following specification and illustrated in the accompanying drawings, in which—

Figure 1:
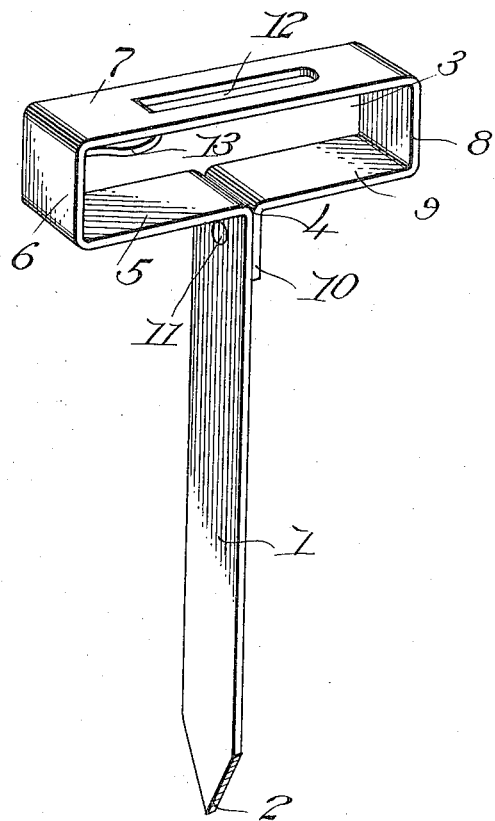
Figure 2:
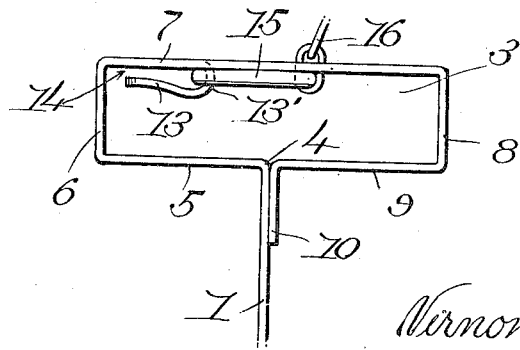

Figure 1 is a perspective view of a device of the above described character, in which the preferred form of my invention is illustrated. Fig. 2 is a fragmentary view of the same showing the head in side elevation.

Similar reference characters indicate similar parts throughout the various views of the drawings.

For convenience my invention is termed a stake throughout the specification, but it will be understood that I do not desire to be limited to this particular name or to any use which I may set forth hereinafter for my device.

Referring more particularly to the drawings, I provide a stake of the above described character which is formed from a single strap of bendable metal, having a shank 1, the free end of said shank being provided with a point 2 for the purpose of facilitating penetration. The opposite end of said shank 1 is provided with a substantially rectangular head, indicated generally by the numeral 3. The said head 3 is disposed at right angles to the longitudinal axis of the shank 1, and is formed by bending the said strap of metal at substantially right angles at the point 4, thereby forming the laterally extending portion 5. The portion 5 at the point 6 is bent upon itself into parallel relation therewith to form a laterally extending face 7, said face 7 being bent upon itself at 8 to provide the side 9, said side 9 terminating and a down-turned flange 10 which is adapted to be secured to the upper end, and adjacent the point 4 of the shank 1 by a rivet or other suitable means 11.

From the above it will be seen that I have provided a head for my improved stake which will facilitate the insertion of the same into the ground, and will also serve as a handle whereby to extract the stake.

The latterly extending face 7 is provided with a centrally disposed elongated opening 12, said elongated opening 12 being formed by striking out a portion of the face 7 and bending the same back and into the head 3 to provide a hook 13, the free end of said hook 13 being slightly spaced from the head 3, as shown at 14, to allow the insertion of a ring 15 having the rope or chain 16 attached thereto.

As is shown to advantage in Fig. 2 the ring 15 is adapted to engage with the hook 13, the said ring 15 lying preferably in parallel relation to the face 7 of the head 3 and the rope or chain 16 passing through the elongated opening 12 thereby holding the ring 15 at all times in engagement with the hook 13.

In its use my improved stake is inserted into the ground or elsewhere and the ring 15 on the end of the chain or rope 16 is inserted through the elongated opening 12, said ring 15 being engaged with the hook 13 thereby insuring the positive securement of the chain to the head 3 of the stake. While the head has been shown substantially rectangular the shape of the same is not material, however, the hook 13 should be so positioned within the head 3 as will prevent the ring 15 from moving backward to the point 14 and becoming disengaged from the said hook 13. This may be more readily done by providing a ring of less diameter than the length of the hook 13 thereby when the said ring would be moved rearward to the point 14, the portion 13' of the hook 13 would engage the periphery of the ring and prevent further movement in that direction, thereby preventing the ring from dropping off the hook.

From the above it will be readily appreciated by those skilled in the art that I have provided a simple, strong and durable picket pin or stake which is positive in performing its functions and also cheap to manufacture, and while I have shown a specific form of construction for my invention, I reserve the right to make such minor changes in the details thereof which shall not depart from the spirit and scope of the appended claims.

Having thus described my invention, what I claim and desire to secure by Letters Patent is:—

1. As an article of manufacture, picket pin including a metal strap formed to provide an object engaging shank, and a head formed therefrom having a portion thereof struck out to provide a hook.

2. Picket pin, including a metal strap one end of which is formed to provide a penetrable object engaging member, and the opposite end formed into a head, said head adapted to lie above the object and having a struck-out portion thereon to provide a hook for engagement of an object to be held.

3. Picket pin having a shank formed from a strap of bendable metal, an end of said shank formed with a substantially rectangular head, and a hook associated with said head, for attachment of an object to be held.

4. Picket pin, formed from a strap of bendable metal and provided with a shank, an end of said shank being provided with a head and a hook struck out from a portion of said head and disposed within the latter, to facilitate the securement of an object to be held.

5. Picket pin, including in combination with a shank having a head, a hook formed by striking out a portion of said head, and a ring engageable with the hook.

6. Picket pin, including in combination with a shank having a substantially rectangular head on one end thereof, a hook struck from said head and disposed within the head, and a ring engageable with said hook.

7. Picket pin, including in combination with a shank having a head, a portion of said head being struck out to provide an elongated aperture and a retaining hook, and a ring engageable with said hook, said ring being adapted to lie in proximity to the head when connected to a flexible retaining element.

In testimony whereof I affix my signature in presence of two witnesses.

VERNON FRITZ.

Witnesses:
CONRAD FRITZ,
HERMAN KEHE.

Copies of this patent may be obtained for five cents each, by addressing the "Commissioner of Patents, Washington, D. C."